United States Patent [19]

Favard

[11] 3,795,852

[45] Mar. 5, 1974

[54] DEVICE ENSURING THE AUTOMATIC STOPPAGE OF A GUIDED MOVING BODY AT DESIRED POSITIONS NOT DEFINED BY EXTERIOR REFERENCE OR GUIDE MARKS

[76] Inventor: Joseph Favard, 31 Rue du Docteur Finlay, Paris, 15, France

[22] Filed: July 24, 1972

[21] Appl. No.: 275,090

[30] Foreign Application Priority Data
July 23, 1971  France .............................. 71.27094

[52] U.S. Cl..................... 318/602, 318/640, 318/480
[51] Int. Cl. ............................................. G05b 19/28
[58] Field of Search ............ 318/602, 640, 594, 480

[56] References Cited
UNITED STATES PATENTS
3,193,744  7/1965  Seward ............................ 318/640 X
2,945,167  7/1960  Gunther ............................... 318/640
3,504,245  3/1970  Cotton et al. .................... 318/594 X
3,402,836  9/1968  Debrey et al. .................. 318/602 X
3,516,557  6/1970  Kaplan ............................ 318/602 X Primary Examiner—B. Dobeck
Attorney, Agent, or Firm—Cushman, Darby & Cushman

[57] ABSTRACT

A system for stopping a body in one of several possible stop zones along a limited path. The system includes a servo, including a drive, controlled by a comparator, and a special position encoding arrangement including a binary disc encoder for giving a fine indication of position and a second disc encoder with tracks defining successive sectors corresponding to the number of stop zones, a track of which the angular segments correspond to the stop zones and are each within one of the sectors and a further track having segments angularly overlapping the stop zone segments. The various tracks can provide signals in anticipation of an approach to a desired stopping position.

5 Claims, 4 Drawing Figures

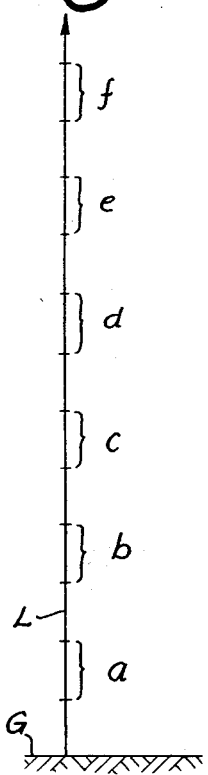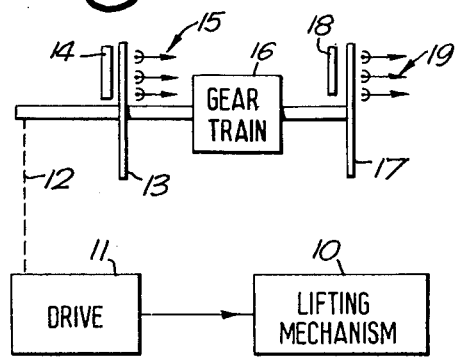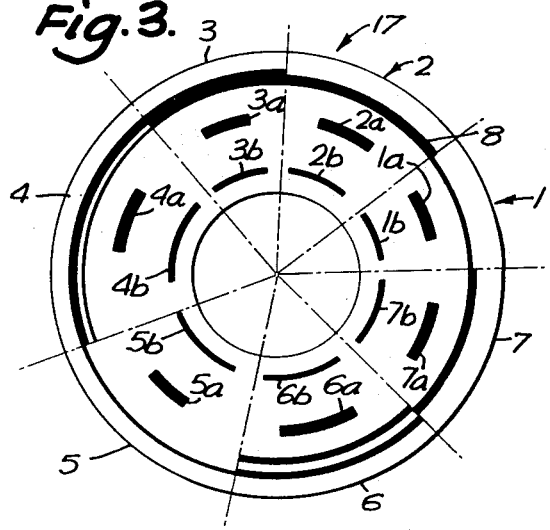

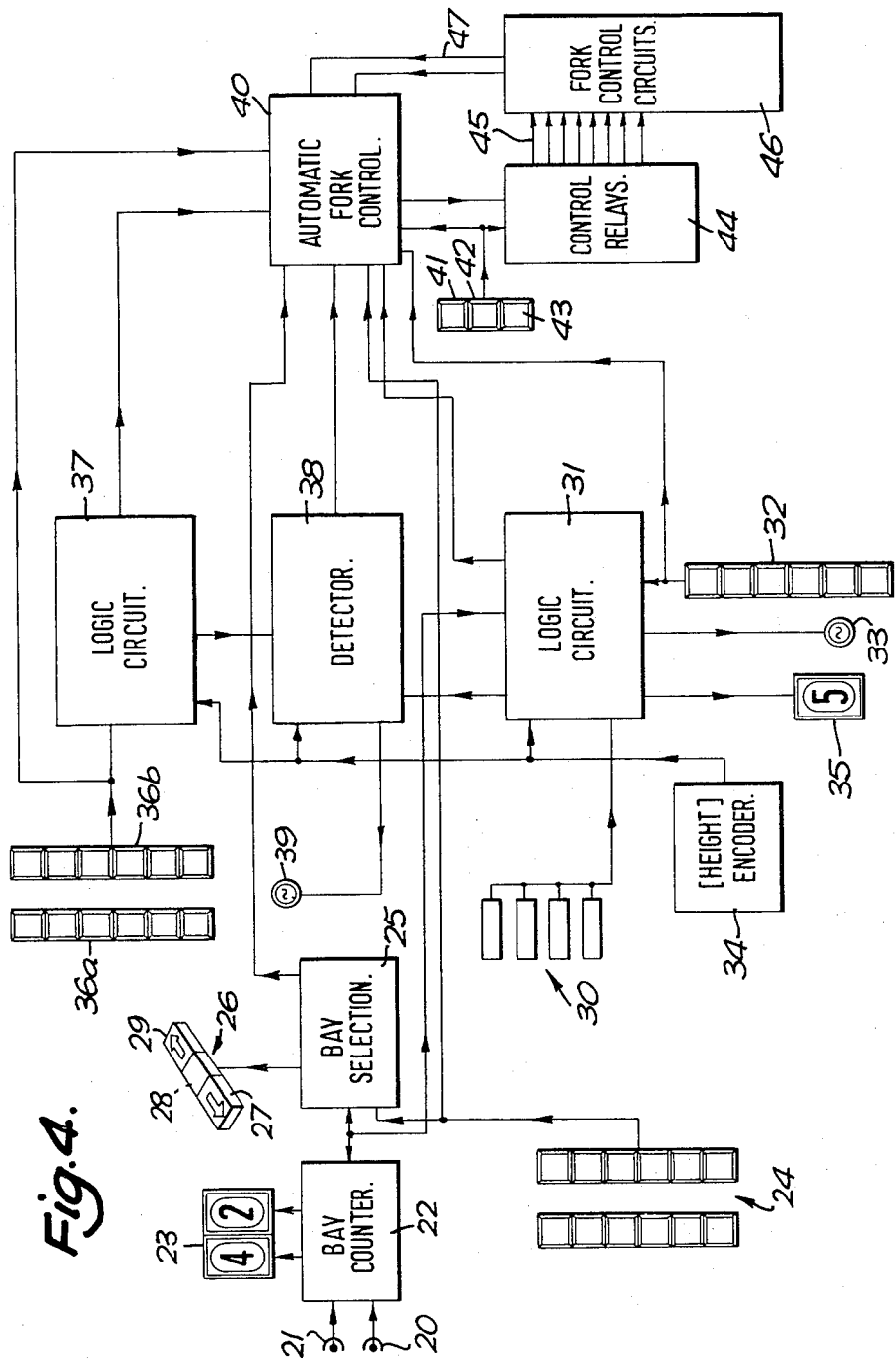

DEVICE ENSURING THE AUTOMATIC STOPPAGE OF A GUIDED MOVING BODY AT DESIRED POSITIONS NOT DEFINED BY EXTERIOR REFERENCE OR GUIDE MARKS

This invention relates to a system for automatically stopping a guided movable body at desired positions without reference to sensible reference or guide marks provided for example along the path of the moving body. In general, the path may be either straight or arcuate provided that it is of limited extent.

It will be understood that such a system will include a comparator for comparing signals denoting the actual and desired positions of the body and a drive mechanism under the control of the comparator. The desired position may be selected by manually operable selectors.

Ordinary numerical control systems tend to be extremely delicate and complex. The present invention has two main aspects, namely the arrangement of the system so that normally the guided moving body will only stop in one of a plurality of spaced-apart stop zones along the path of traversal of the body and the provision of a novel angular encoding system as a source of signals denoting entry into or approach of a desired stopping zone.

Accordingly the present invention is particularly suitable for a controlled loading and unloading process in which industrial fork lift trucks stack or unstack articles at varying heights, the stacks being located in pluralities of bays along specified aisles. In such a process there is normally a discrete number of vertical positions or zones at which articles can be stacked and the present invention can be used to control the vertical position of the forks of a truck whereas various other guidance systems can be used to identify, by reference to marks on stanchions or the like, the bay and aisle in which a truck is located.

In order to produce control signals denoting the presence of the body at or near the desired stopping position there is, according to the invention, provided an encoding arrangement comprising a first angular encoder adapted to indicate the position of the body unambiguously within any one of a plurality of possible stop zones, spaced apart along the said path, and a second angular encoder arranged to make not more than one revolution for a complete traversal of the body along its path and having a set of tracks arranged to define a plurality of respective binary signals each associated with a plurality of successive sectors each embracing an arc corresponding to one of the stop zones.

Conveniently the second encoder has at least one further track having discrete segments each angularly embraced by the said sectors and denoting more coarsely than the first encoder proximity to a stopping position. There may be two tracks of this kind, one having segments whose angular extent precisely corresponds to the stopping zones and another track whose segments each angularly extend on each side of an arc corresponding to a respective stop zone. The first of these tracks can be used to indicate exactly when the body is in a stopping zone and the second track can be used to denote when the body approaches a stop zone. Both tracks could be used for checking purposes but both may be used for providing signals that effect the slowing down of a drive means in anticipation of entry of the body into a stopping zone.

Reference will hereinafter be made to the accompanying drawings, in which:

FIG. 1 is an explanatory diagram;

FIG. 2 is a schematic diagram of a drive system and an associated encoding system;

FIG. 3 is a representation of a coarse encoder; and

FIG. 4 is a schematic diagram illustrating a loading control system including the present invention.

FIG. 1 illustrates a vertical line L denoting the path of a guided body. Hereinafter, the body will be assumed to be the lifting forks of an industrial fork lift truck. Spaced apart along the path L are (not to scale) several possible stop zones, in this case seven zones denoted $a$ to $f$, each spanning different ranges of height above the ground G.

FIG. 2 illustrates diagrammatically a lifting mechanism 10, and a drive 11 which may comprise a hoisting winch or a hydraulic jack. The drive is linked by any suitable means 12, such as the axis of the hoisting winch or a pinion fixed onto a rack associated with the hydraulic jack, to an encoding arrangement. This consists of an encoding disc 13 which may be of the type having translucent and opaque portions disposed according to the information content of the disc, co-operating with an illuminator 14 and an array 15 of photocells arranged to read the adjacent tracks and provide a signal or signals corresponding to the information provided by the disc in accord with its angular position. The encoder disc 13 is coupled by means of a step-down gear train 16 to a second encoding disc 17 which co-operates with an illuminator 18 and an array 19 of photocells to provide coarser information in accord with its angular position.

It will be appreciated that precise knowledge of the position of the moving body, the fork assembly of the truck, is only useful when the body is situated in one of the stop zones $a$ to $f$. In order to provide precise information on the position of a body within a stop zone, the disc 13 may be coupled to the drive by any well-known means to make not more than one revolution as the body traverses the longest of the stop zones. The information capacity of the disc, conveniently measured in bits, must be at least equal to the number of the smallest possible steps in the longest stop zone. With this in mind, the first disc can be an ordinary binary coded disc with a plurality sensible information of tracks each co-operating with a respective photocell to provide a respective one of a plurality of digital words each corresponding to a step of the resolution required for stopping the body. For example if the longest stop zone embraces thirty two possible stopping positions, the first encoder may have five tracks. Such encoding discs are well-known in themselves and need not be described in any greater detail.

FIG. 3 illustrates the encoding disc 17 which is used to provide a coarse indication of proximity to or entry into a stop zone of the moving body. It will be understood that this disc would be used with an array of pick-ups, as is schematically illustrated by FIG. 2. The disc is divided into a plurality of successive sectors, in FIG. 3 denoted as the arcs 1 to 7. The number of sectors corresponds to the number of stop zones. A first set of sensible information tracks 8 on the disc is coded to have the same number of binary bits as there are sectors. Thus in this example, the track 8 has seven segments, each invariant over each of the arcs 1 to 7 and each denoting a different number. In addition the disc carries two other sensible information tracks. One of them has segments 1a to 7a whose angular extent corresponds to the extent of each stop zone. Thus in general a pickup adapted to sense the circular track constituted by the segments 1a to 7a will produce a signal of one value when the body is in a stop zone and a signal of another value when the body is not in a stop zone. A third track is constituted by the discontinuous arcuate segments 1b to 7b each forming part of a circle. Each of these segments is greater in extent than the respective stop zone segment 1a to 7a respectively. The tracks may be formed by slots in the disc.

It will be apparent that each sector defined by the successive discontinuities of the first track, that is to say the sectors over which the binary reference number provided by the first tracks is unchanging, is of greater angular extent than the associated second and third tracks and therefore embraces them in an angular sense.

The arcs 1 to 7 can be unequal; the segments 1a to 7a are each arranged about the middle of each arc.

In order to provide a specific example of a system that might be used, let one assume that it is necessary to ensure the automatic stopping of a moving body whose total travel is 1024cm. at a certain number of precise positions, these positions being distributed in seven stop zones, of which the broadest is 20cm. If the accuracy of stopping is to be 0.5cm, the fine encoder 13, which defines with an accuracy of 0.5mm the position of the moving body in each of the stop zones, may have six tracks and may be driven so as to effect 32 revolutions for the entire travel of 1024cm. It will be appreciated that with six tracks the bit capacity of the disc is 64, 32 cycles of revolution of which yield 2 × 1024 positions. The encoder 13 can drive through a reduction ratio of 32:1 the coarse angular coder which for the complete traverse of the moving body will execute one revolution.

In order to bring about the automatic stop of the moving body at its arrival at the given point on its course, it is sufficient to detect the coincidence of the number defining the sector in which the relevant stop zone is located, a "validation" signal indicating that the moving body has entered the stop zone, and of the binary number (obtained from the encoder 13) defining the exact stop position with corresponding signals obtained from a selector arrangement. In order to effect retardation prior to stopping, it is sufficient to detect the coincidence of the sector number with a corresponding reference in the presence of the signal obtained from one of the segments 1b to 7b.

FIG. 4 illustrates how the present invention may be incorporated into an automatic loading system. It will be assumed hereinafter that a fork lift truck is provided with a system as described with reference to FIGS. 2 and 3 and carries the system indicated in FIG. 4, there being provided in a warehouse or like loading region a plurality of aisles each with a plurality of bays denoted by characteristic marks on walls or stanchions, which marks can be sensed by sensors provided on the truck as explained hereinafter.

In order to sense the number of a bay into which it is desired to stack or unstack, the truck carries a pair of photoelectric sensors 20 and 21 adapted to count marks on walls or stanchions and to feed signals to a bay counter 22 which drives a display device 23 to indicate to an operator the number of the bay. The bay in which operation is to take place in indicated by operation of an array of push buttons 24 in order to set an appropriate signal into a bay selection system 25. By a comparison of the actual bay that the truck is passing with the number of the selected bay the bay selection system drives a display device 23 having three segments, a central segment 28 which lights up to indicate that the operator is approaching the required bay and should slow down the truck, and two indicators 27 and 29 with arrows on them to indicate that the operator should drive or continue to drive in the direction indicated by the illuminated arrow.

Also on the truck is provided an array 30 of photoelectric sensors co-operating with fixed marks to identify the aisle in which the truck is located. These signals are fed to a logic circuit 31. An array 32 of push buttons is provided to enable the operator to feed to the system 31 a signal denoting the aisle in which the required bay is located. By a comparison of this reference signal with the signal from the sensors the logic system can light a lamp 33 which lights if the aisle in which the truck is located is incorrect.

A height encoder 34 as described with reference to FIGS. 2 and 3 is provided in order to feed to the logic system 31 signals denoting the actual height of the forks of the trucks and the entry of the forks into a stopping zone. A display 35 may be provided in order to indicate the stopping zone or nearest stopping zone.

Also within reach of the operator is an array pf level selection push buttons 36. These are in two sets, 36a and 36b, which are selected according to whether there is to be stacking or destacking. One of the advantages of the configuration of encoder disc shown in FIG. 3 is that the retardation of the drive system as the body approaches a stop zone can easily and conveniently be made different according as the body is rising to enter the stop zone or being lowered to enter the stop zone. It is convenient to provide separate sets of push buttons according to whether there is to be raising or lowering and the signals need sorting by a logic circuit 37 which is coupled to a vertical stopping point detector 38.

The level selector buttons 36, logic circuit 37, the stopping point detector 38, the bay selector buttons 24 and the logic circuit 31 are all coupled to the automatic fork control 40. In accord with the signals fed to it this provides slow or high speed lift or lower or stop together with extension and retraction when it is desired to load and unload. Overriding manual control buttons 41, 42 and 43 may be provided in order to effect lift, stop and lowering of the forks respectively. These push buttons are coupled to the fork control 40 and to a control relay system 44 coupled by a plurality of lines to the fork control circuits 46. This circuit may be coupled by lines 47 which carry signals denoting the condition of the forks back to the automatic fork control circuit 40.

I claim:

1. In a system for stopping a guided movable body at desired positions within stop zones along a path and including a comparator for comparing signals denoting the actual and desired positions and a drive mechanism under the control of the comparator, an encoding arrangement for providing the signals denoting the actual position, the said encoding arrangement comprising:

a first angular encoder means arranged to make a plurality of revolutions while said body moves along said path and adapted with sensible information carried thereon at least identifying each of a number of the smallest possible steps in the longest stop zone to indicate the position of the body unambiguously within any one of a plurality of said stop zones including said longest stop zone, spaced apart along the said path, and a second separate angular encoder means arranged to make not more than one revolution for a complete traversal of the body along said path and having a set of sensible information tracks arranged thereon in sectors to define a plurality of respectively associated binary signals in parallel, each parallel binary signal being associated with one of said sectors on said second encoder means and embracing an arc thereon corresponding to and unambiguously identifying one of the stop zones.

2. A system according to claim 1 in which the second separate angular encoder means has at least one further track thereon having discrete sensible segments each angularly embraced by a respectively corresponding one of the said sectors and denoting more coarsely than the first encoder means proximity to a stopping position.

3. A system according to claim 2 in which the second separate angular encoder means has a track thereon having sensible segments whose angular extents precisely correspond to respectively corresponding stop zones and another track whose segments each angularly extend on each side of an arc corresponding to a respectively corresponding stop zone.

4. In a system for stopping a guided movable body at desired positions along a path and including a comparator for comparing signals denoting actual and desired positions of the body respectively and a drive mechanism, coupled to the comparator, for driving the body under the control of the comparator, an encoding arrangement for providing signals denoting the actual position of the said body, the said encoding arrangement comprising:

a. a first angular encoder including index means for indicating the position of the body precisely within any one of a plurality of zones spaced apart along the said path;

b. means for reading out from said first angular encoder the position indicated by said index means;

c. a second angular encoder having a first track for defining a plurality of respective binary signals each unambiguously denoting a respective one of said zones, said track having discontinuities delimiting on said second angular encoder a plurality of successive sectors each embracing an arc corresponding to a respective one of said zones; said second angular encoder also having a second track composed of discrete segments each angularly embraced by the said sectors and each having an angular extent corresponding to the length of the respective zone;

d. means for reading out signals from said tracks of said second angular encoder; and e. means for driving said encoders such that said second encoder executes not more than one revolution for a complete traversal of the body along its path and said first encoder executes a plurality of revolutions for a complete traversal of the body along its path.

5. The structure set forth in claim 4 wherein said second angular encoder carries a third track composed of spaced apart segments each of which extends angularly on each side of a respective segment of said second track.

* * * * *